United States Patent
He et al.

(10) Patent No.: US 12,249,309 B2
(45) Date of Patent: Mar. 11, 2025

(54) DAMPING ENHANCEMENT FOR BUBBLE SHEET COMPONENTS

(71) Applicant: GM GLOBAL TECHNOLOGY OPERATIONS LLC, Detroit, MI (US)

(72) Inventors: Song He, Troy, MI (US); Arianna T. Morales, Bloomfield Hills, MI (US); Anil K. Sachdev, Rochester Hills, MI (US); Pavan Kumar Patruni, Bengaluru (IN); Hung-yih Isaac Du, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 17/873,278

(22) Filed: Jul. 26, 2022

(65) Prior Publication Data
US 2024/0038209 A1 Feb. 1, 2024

(51) Int. Cl.
*G10K 11/162* (2006.01)
*B60R 13/08* (2006.01)

(52) U.S. Cl.
CPC ........ *G10K 11/162* (2013.01); *B60R 13/0815* (2013.01)

(58) Field of Classification Search
CPC .............. B60R 13/0815; G10K 11/162; E04B 2001/8476
See application file for complete search history.

(56) References Cited

U.S. PATENT DOCUMENTS

| 2,069,413 | A | * | 2/1937 | Leadbetter | B60R 13/083 428/209 |
| 3,530,029 | A | * | 9/1970 | Lemelson | B29C 44/326 425/506 |
| 9,613,609 | B2 | * | 4/2017 | Caimi | E04B 1/86 |
| 10,189,227 | B2 | | 1/2019 | Sachdev et al. | |
| 10,788,091 | B2 | * | 9/2020 | Audi | B60R 21/04 |
| 2007/0278826 | A1 | * | 12/2007 | Sato | B60R 13/02 296/190.08 |
| 2010/0074772 | A1 | * | 3/2010 | Hoshino | F04B 35/04 417/410.1 |

(Continued)

FOREIGN PATENT DOCUMENTS

| DE | 19827549 A1 | * | 12/1999 | .............. B32B 15/04 |
| KR | 102093798 B1 | * | 3/2020 | |

OTHER PUBLICATIONS

Anil K. Sachdev et al., U.S. Appl. No. 17/492,445, filed Oct. 1, 2021, entitled "Bubble Cover to Reduce Noise and Vibration", 38 pages.

*Primary Examiner* — Jeremy A Luks (57) ABSTRACT

A damping panel includes a first metal and a second metal. The first metal has a first surface and a second surface opposite the first surface. The second metal portion has a third surface and a fourth surface opposite the third surface. A fixed region is where the second surface of the first metal is fixed to the third surface of the second metal. A non-fixed region is where the second surface is not fixed to the third surface. A cavity is disposed between the second surface and the third surface at the non-fixed region. A damping material is disposed on at least one of: at least a portion of the cavity on the second surface, at least a portion of the cavity on the third surface, at least a portion of the first surface, and at least a portion of the fourth surface.

19 Claims, 8 Drawing Sheets

(56) References Cited

U.S. PATENT DOCUMENTS

2011/0091673 A1\* 4/2011 Luger ........................ B32B 1/00
                                                                                  428/36.5
2019/0115004 A1\* 4/2019 Sachdev .............. B21D 35/006
2020/0083778 A1\* 3/2020 Pack ........................ H02K 5/02
2020/0393069 A1   12/2020 Sachdev et al.
2021/0162867 A1\* 6/2021 Clay ..................... H01M 16/00

\* cited by examiner

DAMPING ENHANCEMENT FOR BUBBLE SHEET COMPONENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a damping enhancement method and more specifically, to a damping enhancement method for bubble sheet components.

A vehicle typically includes a plurality of components that generate noise, vibration, or harshness (NVH). Additionally, the vehicle's contact and movement along a road surface may generate NVH.

NVH may radiate into an interior of the motor vehicle and be perceived by vehicle occupants as displeasing. Damping may be used to reduce NVH. However, available damping solutions are not always effective.

The present disclosure provides effective damping enhancement, while minimizing added weight to the motor vehicle.

SUMMARY

An example of a damping panel includes a first metal portion and a second metal portion. The first metal portion has a first surface and a second surface opposite the first surface. The second metal portion has a third surface and a fourth surface opposite the third surface. A fixed region is where the second surface of the first metal portion is fixed to the third surface of the second metal portion. A non-fixed region is where the second surface of the first metal portion is not fixed to the third surface of the second metal portion. A cavity is disposed at the non-fixed region and between the second surface of the first metal portion and the third surface of the second metal portion. A damping material is disposed at least one of: at least a portion of and less than all of the cavity on the second surface of the first metal portion; at least a portion of and less than all of the cavity on the third surface of the second metal portion; at least a portion of the first surface of the first metal portion; and at least a portion of the fourth surface of the second metal portion.

In one example, the damping material is disposed on less than all of the non-fixed region on the first surface of the first metal portion.

In one example, the damping material is disposed on the entirety of the non-fixed region on the first surface of the first metal portion.

In one example, the damping material is disposed on less than all of the non-fixed region on the fourth surface of the second metal portion.

In one example, the damping material is disposed on the entirety of the non-fixed region on the fourth surface of the second metal portion.

In one example, the damping material fills the entirety of the cavity.

In one example, the first and second metal portions are made of aluminum.

In one example, the first and second metal portions are made of magnesium.

In one example, the first and second metal portions are welded together at the fixed region.

An example of a damping system includes an inverter housing and an inverter. The inverter is disposed within the inverter housing and includes switches configured to connect and disconnect an electric motor to and from power. The damping panel of any of the above paragraphs is disposed on the inverter housing.

An example of a method of manufacturing a damping panel is provided. The method includes obtaining a first metal portion having a first surface and a second surface opposite the first surface. The method includes obtaining a second metal portion having a third surface and a fourth surface opposite the third surface. The method includes applying the third surface of the second metal portion to the second surface of the first metal portion. The method includes fixing the first metal portion to the second metal portion to create a fixed region and not fixing the first metal portion to the second metal portion to create a non-fixed region. The method includes injecting a gas into the non-fixed region thereby creating a cavity between the second surface and the third surface at the non-fixed region. The method includes applying a damping material to at least one of: at least a portion of the second surface within the cavity; at least a portion of the third surface within the cavity; at least a portion of the first surface of the first metal portion; and at least a portion of the fourth surface of the second metal portion.

In one example, the fixing includes welding.

In one example, the first and second metal portions are made of aluminum.

In one example, the first and second metal portions are made of magnesium.

In one example, the gas is air.

In one example, the applying the damping material occurs concurrently with the injecting the gas.

In one example, the applying the damping material is to less than all of the non-fixed region on the first surface of the first metal portion.

In one example, the applying the damping material is to the entirety of the non-fixed region on the first surface of the first metal portion.

In one example, the applying the damping material is to less than all of the non-fixed region on the fourth surface of the second metal portion.

In one example, the applying the damping material is to the entirety of the non-fixed region on the fourth surface of the second metal portion Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An inverter can be used to apply power to an electric motor from a power source. For example, the inverter may be connected between a direct current (DC) bus and an electric motor. The inverter includes switches that can be switched to convert DC power into alternating current (AC) power for application to the electric motor.

The present application involves damping enhancement of a bubble sheet (a damping panel). The damping panel may be disposed within a vehicle. More specifically, the damping panel may be adhered or attached to any component in the vehicle that generates noise, vibration, or harshness (NVH). For example, the damping panel may be disposed on an inverter cover (a cover of an inverter) of the vehicle. In another example, the damping panel may be disposed on an engine cover of the vehicle. In yet another example, the damping panel may be disposed on a vehicle panel or floor pan of the vehicle. In yet another example, the damping panel may be disposed on a battery tray panel of the vehicle. Additionally, the damping panel may equally be applied to non-vehicles for a component that generates NVH.

Figure 1:
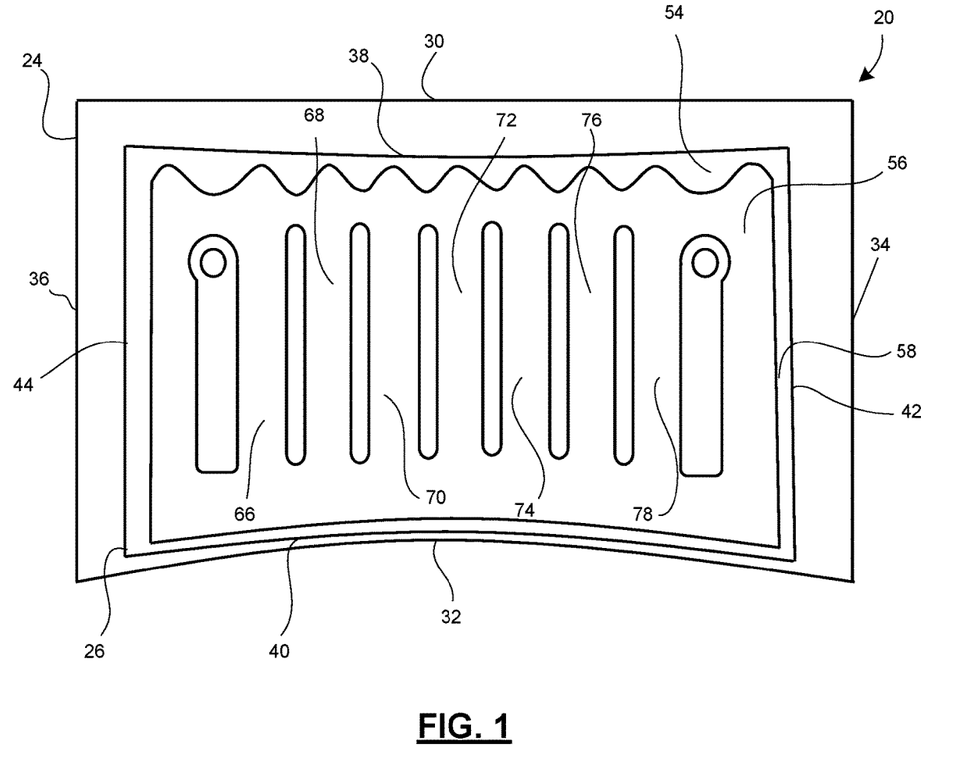
FIG. 1 is a top view of a damping panel.
Figure 2:
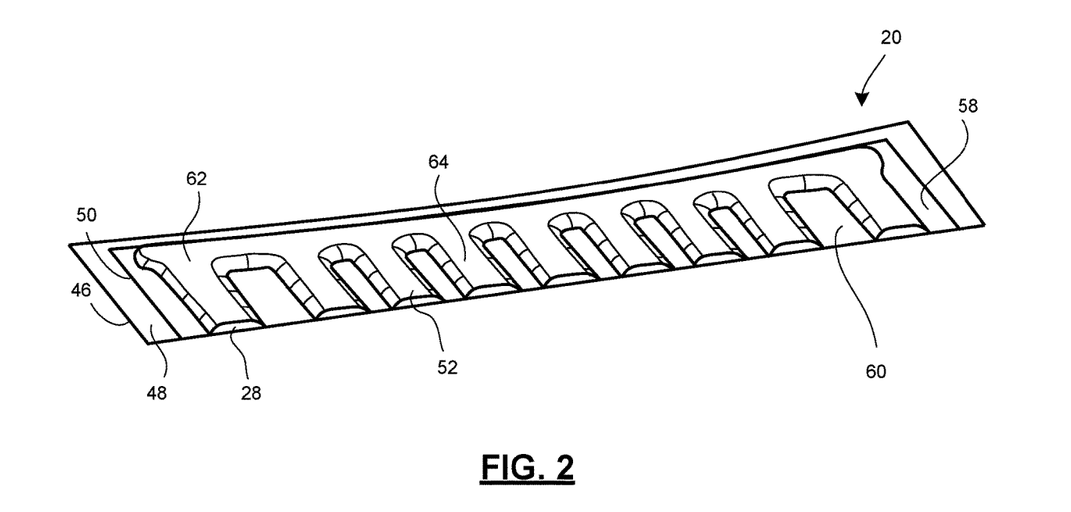
FIG. 2 is a perspective sectional view of the damping panel of FIG. 1.

With reference to FIGS. 1-2, a damping panel 20 is provided. The damping panel 20 may include a first metal portion 24, a second metal portion 26, and a cavity 28 disposed between the first metal portion 24 and the second metal portion 26. The first and second metal portions 24, 26 may be made of a metal, such as aluminum, magnesium, or another suitable metal.

The first metal portion 24 may include a first end (side) 30, a second end (side) 32 opposing the first end 30, and lateral ends (sides) 34, 36 connecting the first and second ends 30, 32. The lateral sides 34, 36 are opposite each other.

Similarly, the second metal portion 26 may include a first end (side) 38, a second end (side) 40 opposing the first end 38, and lateral ends (sides) 42, 44 connecting the first and second ends 38, 40. The lateral sides 38, 40 are opposite each other. While the first and second metal portions 24, 26 are shown in a rectangular shape, the first and second metal portions 24, 26 may be each formed in any shape. For example, the first and second metal portions 24, 26 may be formed in a circular shape. In another example, the first metal portion 24 may be formed in a circular shape and the second metal portion 26 may be formed in a square shape.

The first metal portion 24 also includes a first surface 46 (i.e., an exterior surface) and a second surface 48 (i.e., an interior surface) opposite the first surface 46. The second metal portion 26 includes a first surface 50 (i.e., an exterior surface) and a second surface 52 (i.e., an interior surface) opposing the first surface 50. The first and second metal portions 24, 26 may be sheets of the metal prior to the creation of the cavity 28.

The first and second metal portions 24, 26 are secured together at some locations to define a fixed region 54. The fixed region 54 includes where the first and second metal portions 24, 26 are joined together. Other locations where the first and second metal portions 24, 26 are not joined together provide a non-fixed region 56.

The first, second, and lateral ends 30, 32, 34, 36 of the first metal portion 24 may be positioned adjacent to the first, second, and lateral ends 38, 40, 42, 44 of the second metal portion 26, respectively. The second surface 48 of the first metal portion 24 may face the second surface 52 of the second metal portion 26 and contact the second surface 52 of the second metal portion 26 at the fixed region 54. The second surface 48 of the first metal portion 24 and the second surface 52 of the second metal portion 26 may be secured together at the fixed region 54 and not secured at the non-fixed region 56.

The fixed region 54 may be one continuous fixed region or include multiple fixed regions. The fixed region 54 may have a suitable shape and size for the application. In the example shown, the fixed region 54 is formed into a plurality of fixed regions. The fixed region 54 includes a first (fixed) region 58 that extends around a perimeter of the second metal portion 26 in a substantially rectangular shape and includes a plurality of second regions 60 that extend substantially linearly. While an example number of fixed regions is illustrated, the present application is also applicable to other numbers and configurations of fixed regions. Fixed regions may extend in other directions and be evenly or unevenly spaced apart from each other. For example, the plurality of second regions 60 in the shown embodiment are positioned inboard of the first region 58. The plurality of second regions 60 extend in a direction between the first and second ends 38, 40 of the second metal portion 26, are substantially evenly spaced apart, and extend substantially parallel to each other.

The non-fixed region 56 may form the cavity 28 between the second surface 48 of the first metal portion 24 and the second surface 52 of the second metal portion 26. The cavity 28 may extend toward the first metal portion 24, the second metal portion 26, or a combination of the first and second metal portions 24, 26. For example, the cavity 28 illustrated in FIG. 2 extends towards the second metal portion 26. Additionally, the non-fixed region 56 may be one continuous non-fixed region or include multiple non-fixed regions, depending on the positioning and configuration of the fixed region 54.

The non-fixed region 56 may have a suitable shape and size for the application. In the example of multiple non-fixed regions, the non-fixed regions may be positioned in a suitable configuration. While an example number of non-fixed regions is shown, the present application is also applicable to other numbers of non-fixed regions and different arrangements and configurations of non-fixed regions, such as extending in other directions and be evenly or unevenly spaced apart from each other.

In the example shown, the non-fixed region 56 includes a first portion 62 joined with a plurality of second portions 64 to form one continuous region. The first portion 62 is formed in a substantially rectangular shape and positioned adjacent to the first region 58 of the fixed region 54. The second portions 64 are formed in a substantially linear shape and positioned adjacent to the second regions 60 of the fixed region 54. More specifically, the plurality of second portions 64 has seven portions including a first, second, third, fourth, fifth, sixth, and seventh longitudinal portions 66, 68, 70, 72, 74, 76, 78. However, the quantity of second portions 64 may vary, including greater than and less than seven.

A damping material may be disposed on the first metal portion 24, the second metal portion 26, or a combination of the first and second metal portions 24, 26. More specifically, the damping material may contact the first surface 46 of the first metal portion 24, the second surface 48 of the first metal portion 24, the first surface 50 of the second metal portion 26, the second surface 52 of the second metal portion 26, or a combination thereof. In some examples, the damping material may contact a location of the damping panel 20 where a high vibration energy is identified. The damping material may be, for example, an acrylic, propylene oxide, ethylene oxide, polyolefin elastomers, a silicone, a combination of two or more of the above, or another suitable damping material.

Figure 3:
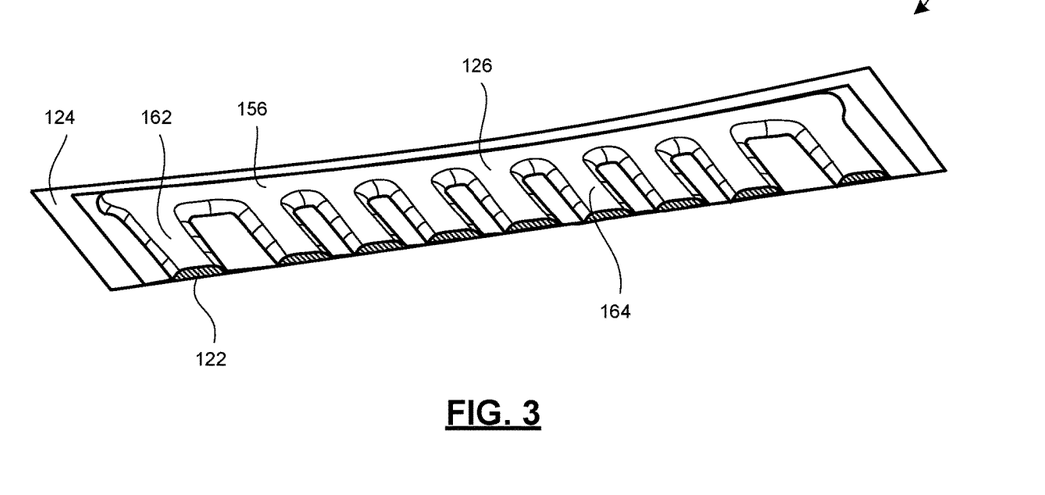
FIG. 3 is a perspective sectional view of a damping panel with damping material applied to all of a cavity.
Figure 4:
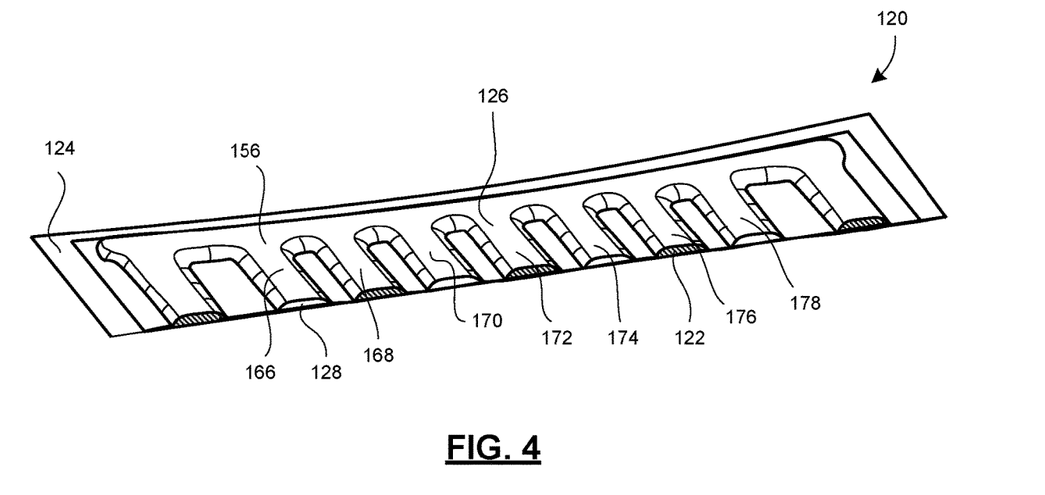
FIG. 4 is a perspective sectional view of the damping panel of FIG. 3, with damping material applied to less than all of the cavity.

With reference to FIGS. 3-4, a damping panel 120 may include a damping material 122 disposed within (filling) a cavity 128 of the damping panel 120. The damping panel 120 may be the same as the damping panel 20 with added damping material 122. Accordingly, the damping panel 120 includes a first metal portion 124 fixed to a second metal portion 126, and a non-fixed region 156 including a first portion 162 and a plurality of second portions 164.

As shown in FIG. 3, the damping material 122 may be disposed within (and fill) the entire cavity 128. As shown in FIG. 4, the damping material 122 may be disposed within less than all of the cavity 128. For example, the damping material 122 may be disposed within all or less than all of the first portion 162 of the non-fixed region 156, all or less than all of the second portions 164 of the non-fixed region 156, or a combination thereof.

In the example of FIG. 4, the damping material 122 is disposed within all of the first portion 162 and within all of a second, fourth, and sixth longitudinal portions 168, 172, 176 of the non-fixed region 156. Air (or another gas) is disposed within a first, third, fifth, and seventh longitudinal portions 166, 170, 174, 178 of the non-fixed region 156. The damping material 122 may be applied to the second portions 164 of the non-fixed region 156 in an alternating configuration or in another configuration.

Figure 5:
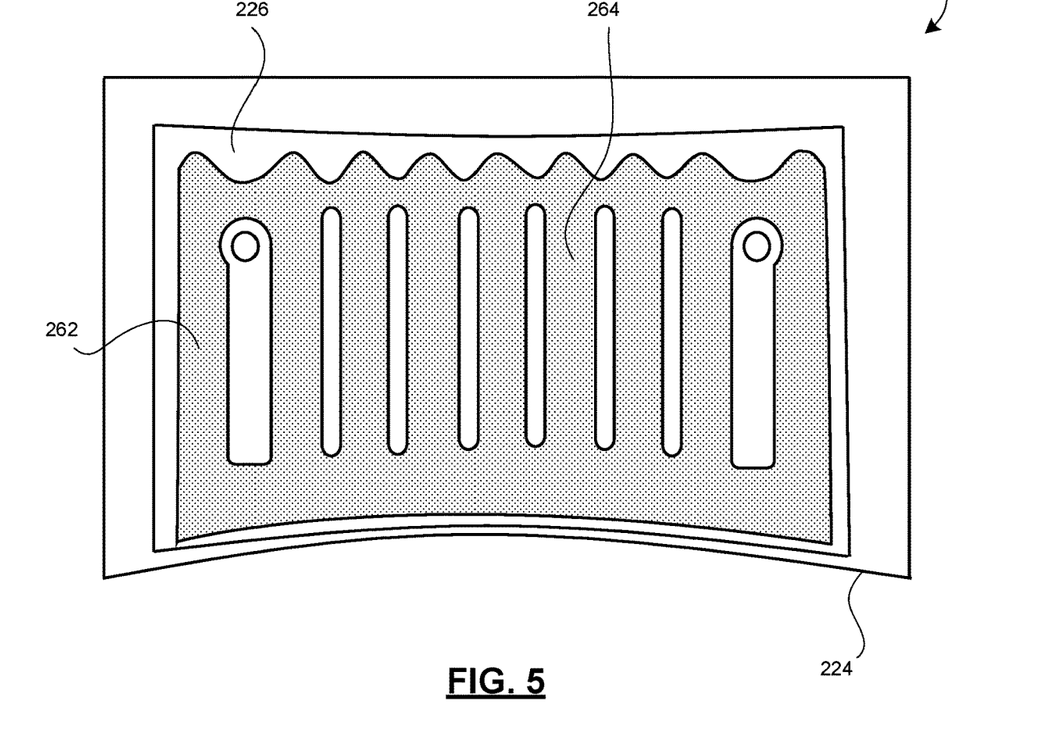
FIG. 5 is a top view of a damping panel with damping material applied to a first surface of a second metal for all of a non-fixed region.
Figure 6:
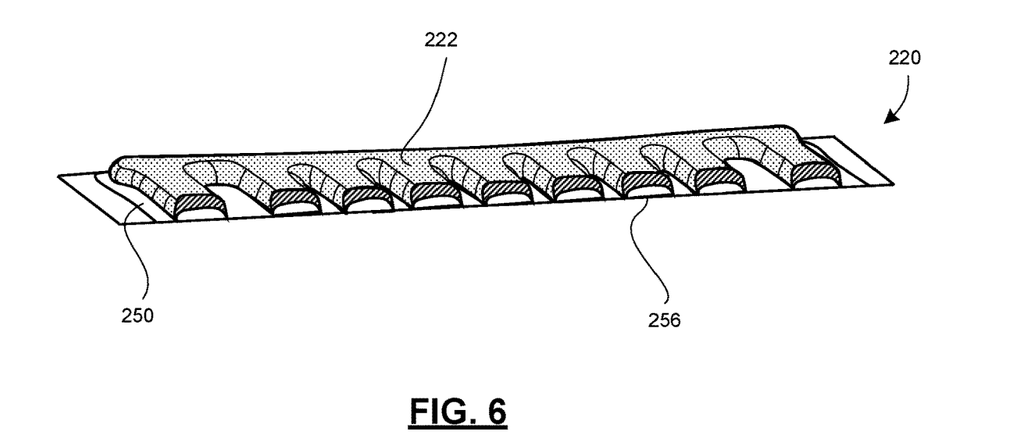
FIG. 6 is a perspective sectional view of the damping panel of FIG. 5.

Referring to FIGS. 5-8, a damping panel 220 may include a damping material 222 disposed on a first surface 250 (i.e., exterior surface) of a second metal portion 226. The damping panel 220 may be the same as the damping panel 20 with the damping material 222 added. Accordingly, the damping panel 220 includes a first metal portion 224 fixed to the second metal portion 226 at a fixed region, and a non-fixed region 256 including a first portion 262 and a plurality of second portions 264. With reference to FIGS. 5-6, the damping material 222 may be disposed on the first surface 250 of the second metal portion 226 on the entirety of the non-fixed region 256.

Figure 7:
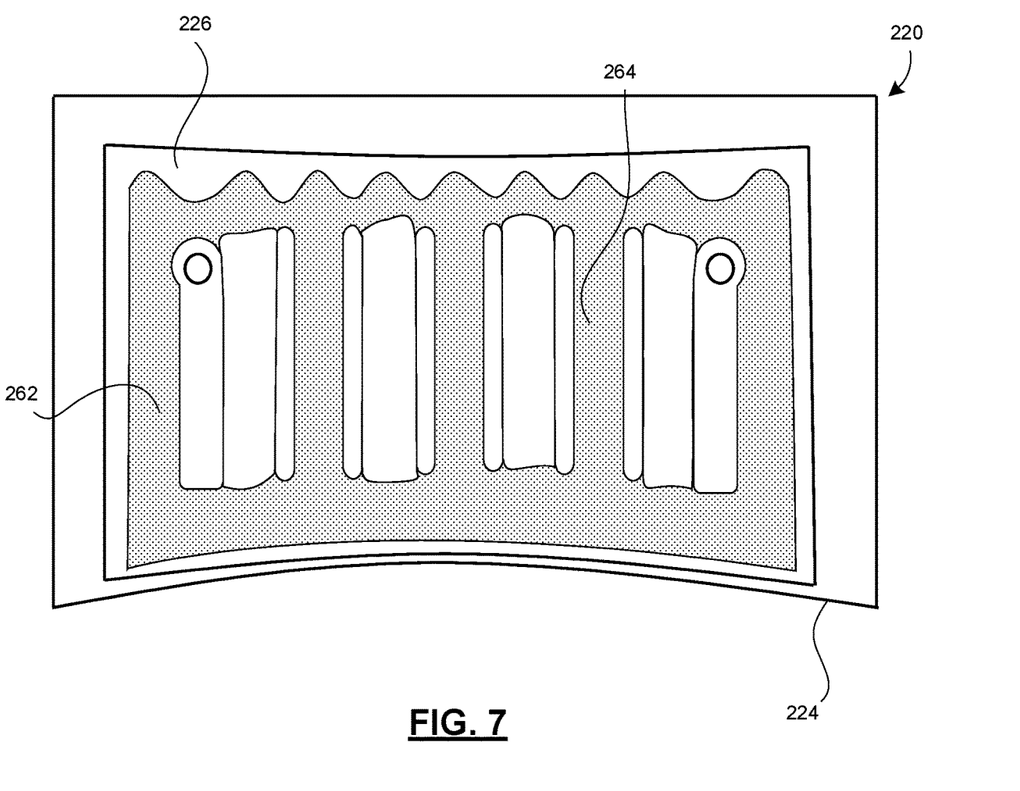
FIG. 7 is a top view of the damping panel of FIG. 5, with damping material applied to the first surface of the second metal for less than all of the non-fixed region.
Figure 8:
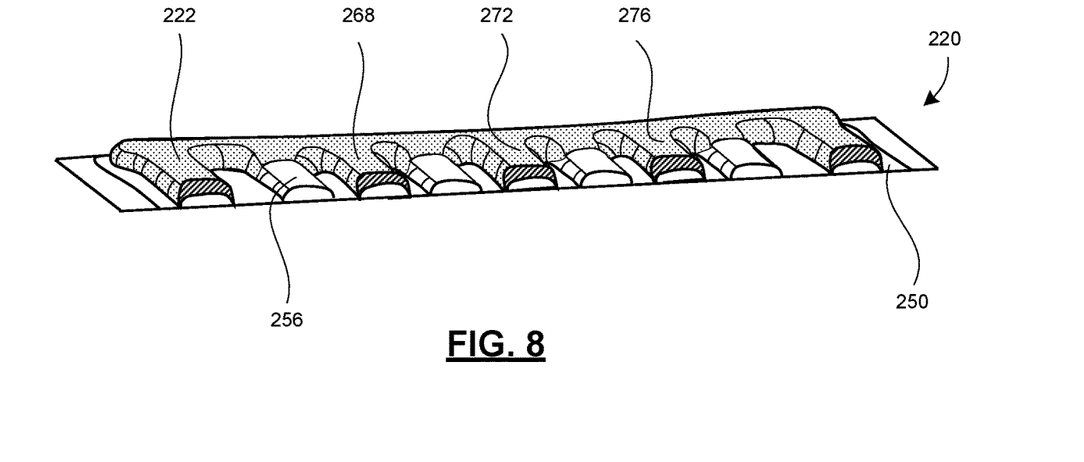
FIG. 8 is a perspective sectional view of the damping panel of FIG. 7.

With reference to FIGS. 7-8, the damping material 222 may be disposed on the first surface 250 of the second metal portion 226 for less than all of the non-fixed region 256. For example, the damping material 222 may be disposed on all or less than all of the first portion 262 of the non-fixed region 256, all or less than all of the second portions 264 of the non-fixed region 256, or a combination thereof. In the example of FIGS. 7-8, the damping material 222 is disposed on all of the first portion 262 and on all of a second, fourth, and sixth longitudinal portion 268, 272, 276 of the non-fixed region 256. The damping material 222 is not disposed on the longitudinal portions of the non-fixed region 256 between the second, fourth, and sixth longitudinal portions 268, 272, 276 of the non-fixed region 256. The damping material 222 may be applied to the second portions 264 of the non-fixed region 256 in an alternating configuration or in another suitable configuration. In some examples, the damping material 222 is applied to a portion of the non-fixed region 256 where high vibration energies are identified.

Figure 9:
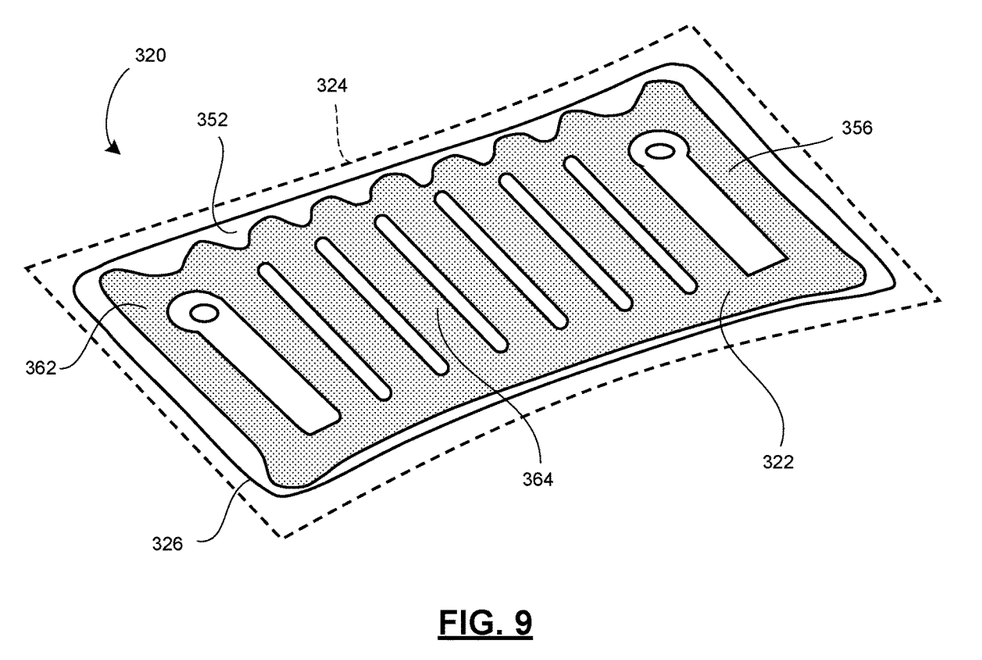
FIG. 9 is a bottom view of another damping panel with damping material applied to a second surface of a second metal for all of a non-fixed region.
Figure 10:
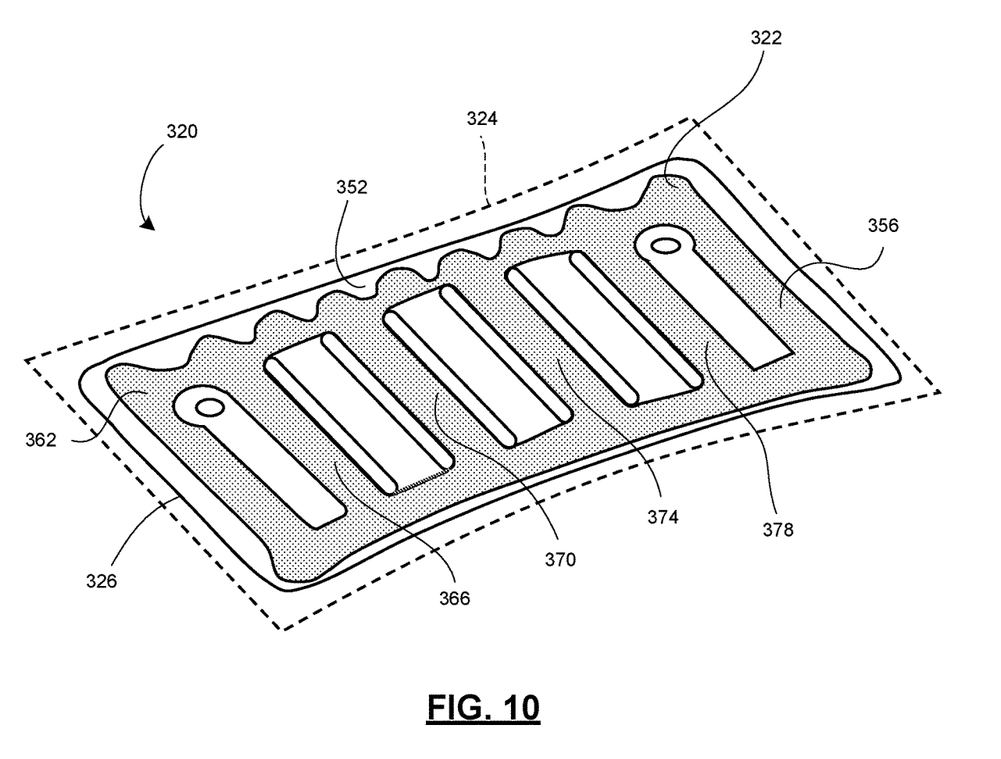
FIG. 10 a bottom view of the damping panel of FIG. 9, with damping material applied to the second surface of the second metal for less than all of the non-fixed region.

Referring to FIGS. 9-10, a damping panel 320 may include a damping material 322 disposed on a second surface 352 (i.e., interior surface) of a second metal portion 326. The damping panel 320 may be the same as the damping panel 20 with the damping material 322 added. According, the damping panel 320 includes a first metal portion 324 fixed to the second metal 326 at a fixed region, and a non-fixed region 356 including a first portion 362 and a plurality of second portions 364.

With reference to FIG. 9, the damping material 322 may be disposed on the second surface 352 of the second metal 326 for entire the non-fixed region 356. With reference to FIG. 10, the damping material 322 may be disposed on the second surface 352 of the second metal 326 for less than all of the non-fixed region 356. For example, the damping material 322 may be disposed on all or less than all of the first portion 362 of the non-fixed region 356, all or less than all of the second portions 364 of the non-fixed region 356, or a combination thereof. In the shown embodiment, the damping material 322 is disposed on all of the first portion 362 and on all of a first, third, fifth, and seventh longitudinal portions 366, 370, 374, 378 of the non-fixed region 356. The damping material 322 is not disposed on the longitudinal portions of the non-fixed region 356 between the first, third, fifth, and seventh longitudinal portion 366, 370, 374, 378 of the non-fixed region 356. The damping material 322 may be applied the second portions 364 of the non-fixed region 356 in an alternating configuration or in another suitable configuration.

Figure 11:
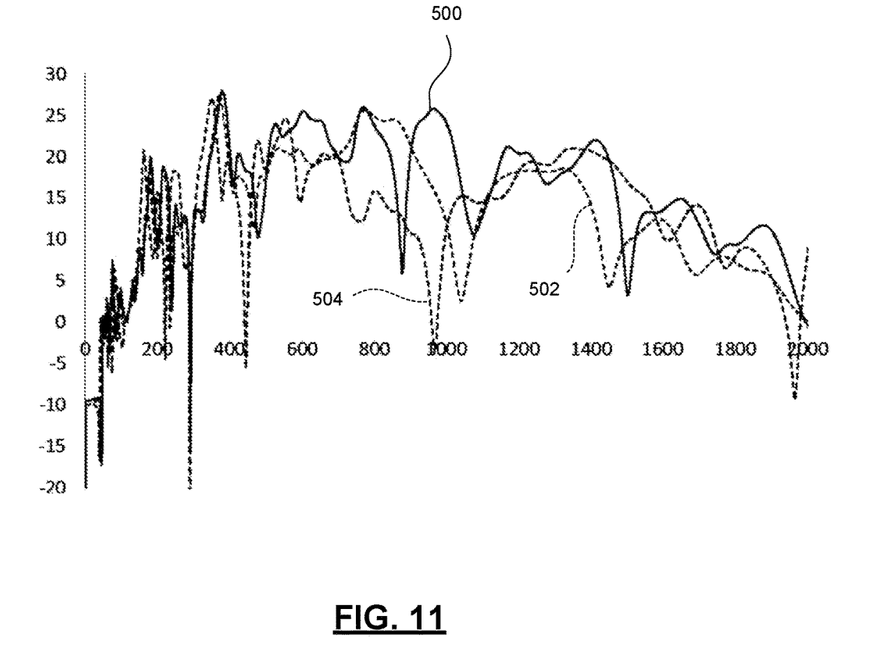
FIG. 11 is a graph representing a first damping curve for a first damping panel, a second damping curve for a second damping panel, and a third damping curve for a third damping panel.

FIG. 11 illustrates a first damping curve 500, a second damping curve 502, and a third damping curve 504 for the damping panels 20, 120, 320, respectively. More specifically, first damping curve 500 represents the damping performance for the damping panel 20 (FIGS. 1-2), where there no damping material have been applied. The second damping curve 502 represents the damping performance for the damping panel 120 with the damping material 122 applied to all of the cavity 128 (FIG. 3). The third damping curve 504 represents the damping performance for the damping panel 320 with the damping material 322 applied to the second surface 352 of the second metal 326 for all of the non-fixed region 356 (e.g., FIG. 9). Each of the damping curves 500, 502, 504 track acceleration as a function of frequency. In other words, each of the damping curves 500, 502, 504 represents a Frequency Response Function (FRF). A lower acceleration in response to frequency yields a more favorable damping performance. As shown, the third damping curve 504 of damping panel 320 represents a lower acceleration in response to frequency than both the first and second damping curves 500, 502. Additionally, the third damping curve 504 does not introduce any new vibration energy transfer functions not found in the first and second damping curves 500, 502. Thus, the damping panel 320 with damping material 322 applied to only the second surface 352 of the second metal 326, may provide enhanced damping performance relative to the damping panel 20 while utilizing less damping material than damping panel 120 with damping material 122 applied to all of the cavity 128.

Figure 12:
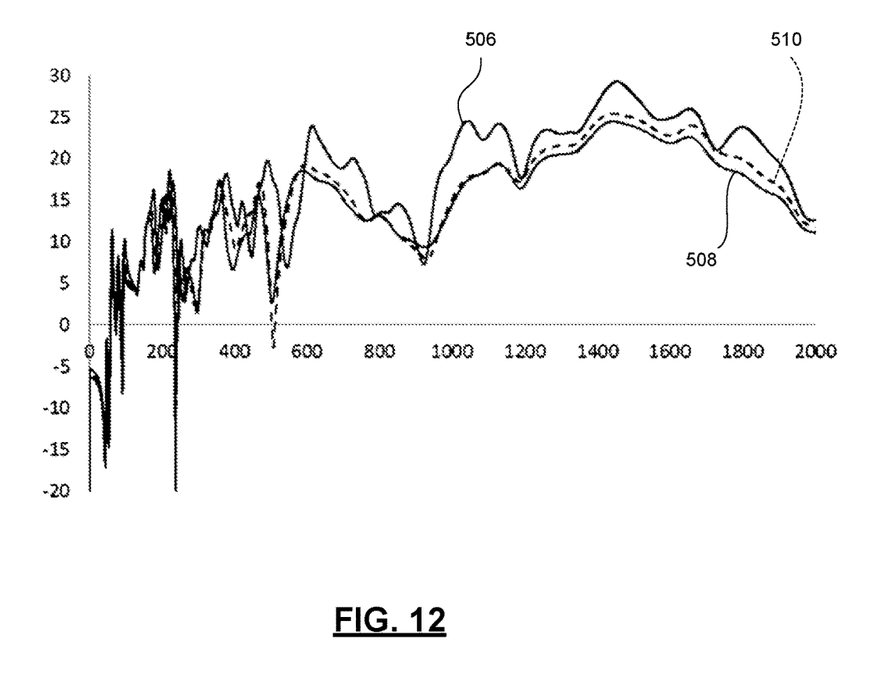
FIG. 12 is a graph representing a first damping curve for a first damping panel, a second damping curve for a second damping panel, and a third damping curve for a third damping panel.

FIG. 12 illustrates a first damping curve 506, a second damping curve 508, and a third damping curve 510 for the damping panel 20 as shown in FIGS. 1-2, the damping panel 220 as shown in FIGS. 5-6, and the damping panel 220 as shown in FIGS. 7-8, respectively. More specifically, the first damping curve 506 represents the damping performance for the damping panel 20, where no damping material has been applied. The second damping curve 508 represents the damping performance for the damping panel 220 when damping material 222 has been applied to the first surface 250 of the second metal 226 for all of the non-fixed region 256. The damping curve 508 represents the damping performance of the damping panel 220 when damping material 222 have been applied on the first surface 250 of the second metal 226 for less than all of the non-fixed region 256. Each of the damping curves 506, 508, 510 tracks acceleration as a function of frequency. In other words, each of the damping curves 506, 508, 510 represents a Frequency Response Function (FRF). A lower acceleration in response to frequency yields a more favorable damping performance. As shown, the second damping curve 508 and the third damping curve 510 are comparable and represent a lower acceleration in response to frequency than the first damping curve 506. Thus, the damping panel 220 provides enhanced damping as compared to damping panel 20. Furthermore, the damping panel 220 when damping material 222 has been applied to less than all of the non-fixed region 256 provides a similar damping performance as compared to when damping material 222 has been applied to all of the non-fixed region 256.

Figure 13:
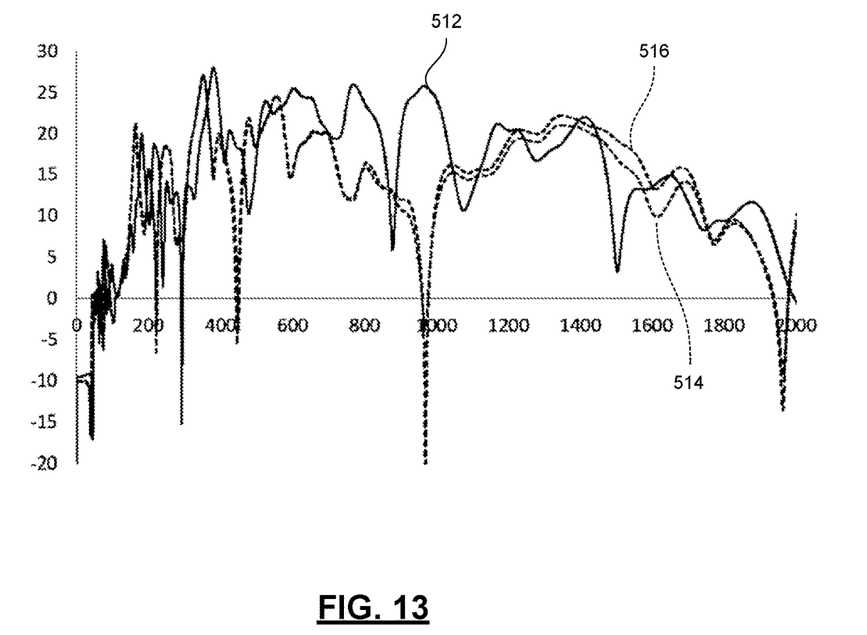
FIG. 13 is a graph representing a first damping curve for a first damping panel, a second damping curve for a second damping panel, and a third damping curve for a third damping panel.

FIG. 13 illustrates a first damping curve 512, a second damping curve 514, and a third damping curve 516 for the damping panel 20 as shown in FIGS. 1-2, the damping panel 320 as shown in FIG. 9, and the damping panel 320 as shown in FIG. 10, respectively. More specifically, the first damping curve 512 represents the damping performance of the damping panel 20, where no damping material has been applied. The second damping curve 514 represents the damping performance of the damping panel 320 when damping material 322 has been applied to the second surface 352 of the second metal 326 for all of the non-fixed region 356. The third damping curve 516 represents the damping performance for the damping panel 320 when damping material 322 has been applied to the second surface 352 of the second metal 326 for less than all of the non-fixed region 356. Each of the damping curves 512, 514, 516 track acceleration as a function of frequency. In other words, each of the damping curves 512, 514, 516 represents a Frequency Response Function (FRF). A lower acceleration in response to frequency yields a more favorable damping performance. As shown, the second damping curve 514 and the third damping curve 516 are comparable. The second and third damping curves 514, 516 demonstrate a lower acceleration in response to frequency than the first damping curve 512 without introducing new vibration energy transfer functions. Thus, the damping panel 320 provides enhanced damping as compared to damping panel 20. Furthermore, the damping panel 320 with damping material 322 applied to less than all of the non-fixed region 356 provides a similar damping performance to when damping material 322 is applied to all of the non-fixed region 356.

Therefore, the damping panels 220, 320 with damping material 222, 322 allow for an enhanced damping performance when compared to the damping panel 20 without damping material. Additionally, damping panels 220, 320 when using damping material 222, 322 in less than all of the non-fixed regions 256, 356 provide comparable results to when using damping material 222, 322 for all of the non-fixed region 256, 356. Accordingly, damping panels 220, 320 applying damping material 222, 322 to less than all of the non-fixed regions 256, 356 may be used without the extra cost and weight of additional damping material, while still achieving a comparable damping performance.

Additionally, applying damping material to a damping panel may result in an enhanced stiffness performance. For example, the damping panels 220, 320 using damping materials 222, 322 may provide an enhanced stiffness performance as compared to damping panel 20.

Figure 14:
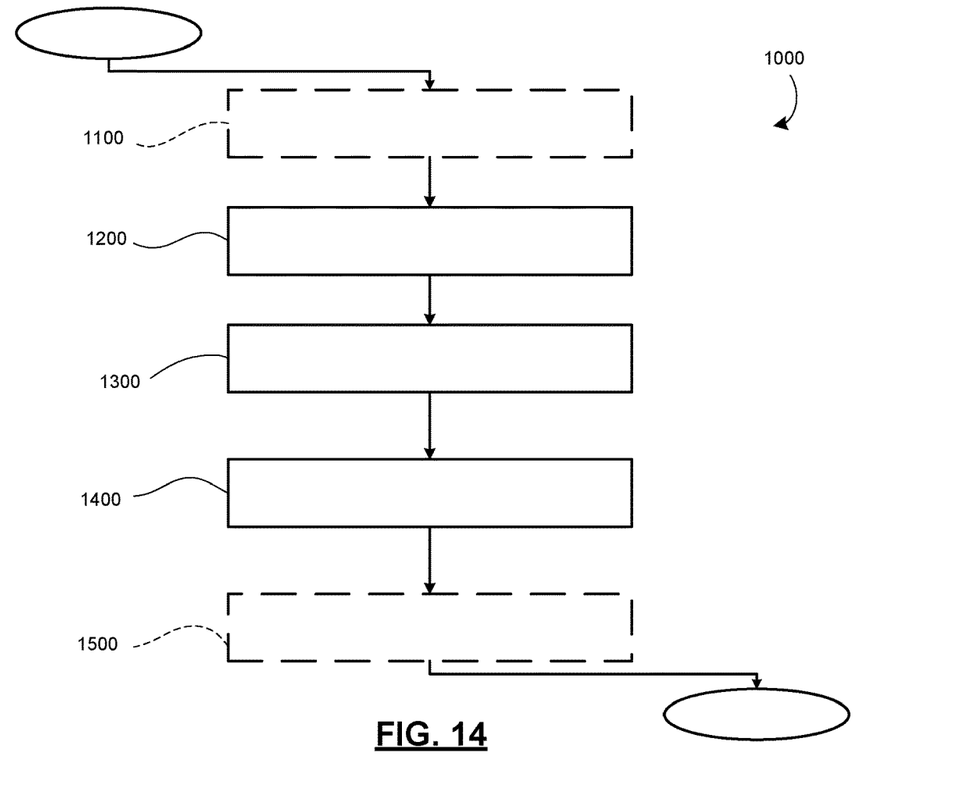
FIG. 14 is a flow chart depicting a method of manufacturing a damping panel.

With reference to FIG. 14, a method 1000 of manufacturing a damping panel is provided. At 1100, the method may optionally include applying the damping material to a surface of a first metal portion and/or a surface of a second metal. The surfaces of the first and second metal portions face each other and will later define the inner surfaces of the cavity.

At 1200, the method may include positioning a first metal portion and the second metal portion adjacent to each other (e.g., one on top of the other). At 1300, the method may include fixing the first metal portion and the second metal portion to one another at selective locations to provide the fixed portion. The first and second metal portions are not fixed together at locations where the damping material is applied. At 1400, the method may include injecting air (or another gas) between the first and second metal portions to create the cavity. The injection of the air (or other gas) creates the cavity by bubbling at least one of the first and second metal portions outwardly. At 1500, the method may include injecting damping material between the first and second metals. In various implementations, the damping material may be injected while the air (or other gas) is injected.

The method 1000 of manufacturing a damping panel will now be described in greater detail. The method is described in relation to damping panels 20, 120, 220, 320 of FIGS. 1-10. However, the method equally applies to other damping panels.

At 1100, the method 1000 may optionally include applying damping material to a second metal portion. For example, the damping material 222 may be applied to the first surface 250 of the second metal portion 226 (FIGS. 5-8), the second surface 352 of the second metal portion 226 (FIGS. 9-10), or a combination thereof. Additionally, the damping material may be applied to all of the first or second surface, less than all of the first or second surface, or a combination thereof. For example, the damping material 222 may be applied to all of the first surface 250 of the second metal portion 226 (FIGS. 5-6), less than all of the first surface 250 of the second metal portion 226 (FIGS. 7-8), all of the second surface of the second metal portion 226 (FIG. 9), or less than all of the second surface of the second metal portion 226 (FIG. 10).

At 1200, the method 1000 may include positioning a first metal portion with respect to the second metal portion. Positioning may include placing a surface of the first metal portion in direct contact with a surface of the second metal portion. Positioning may also include locating the first and/or second metal portions with respect to the other of the first and/or second metal portion according to a predetermined assembly specification. For example and with reference to FIGS. 1-2, the second surface 48 of the first metal portion 24 may be positioned to contact the second surface 52 of the second metal portion 26. Additionally, the first end 30 of the first metal portion 24 may be located a set distance from the first end 38 of the second metal portion 26. Positioning may be performed in a fixture or jig, and may include clamping the first metal portion to the second metal portion.

Returning to FIG. 14, the method at 1300 may further include fixing the first metal portion and the second metal portion to one another at selective locations. The fixing may be performed by adhering or welding the first metal portion to the second metal portion to create an air-tight seal between the first and second metal portions. In some embodiments, the fixing may be performed by welding. A weld may be in the form of a plurality of welds or a single continuous weld. The quantity and positioning of welds may be dependent upon the damping panel's size, shape, and complexity. For example, the weld may be substantially evenly spaced apart from one another and symmetrically positioned, or alternatively, unequally spaced and asymmetrically positioned. The weld(s) may be formed in another shape. Some examples of shapes include circular, linear, rectangular, and the like. For example and with reference to FIGS. 1-2, a plurality of welds are provided to fix the first and second metal portions 24, 26. A continuous weld (not shown) is provided around the perimeter of the second metal portion 26. The continuous weld is formed in a substantially linear pattern at the lateral ends 42, 44 of the second metal portion 26, formed in curved pattern at the second end 40 of the second metal portion 26, and formed in a wave-like pattern at the first end 38 of the second metal portion 26 to create the first region 58. Additionally, a plurality of linear welds are formed in a direction between the first and second ends 30, 32, are substantially evenly spaced apart, and symmetrically positioned to create the plurality of second regions 60.

Returning to FIG. 14, the method 1000 at 1400 may include injecting air (or another gas) between the first and second metal portions. Injecting air (or another gas) between the first and second metal portions (e.g., via one or more non-fixed portions extending to the outer edge) allows the first metal portion, the second metal portion, or a combination of the first and second metal portions to deform away from each other at the non-fixed portions. Deformation of the first and/or second metal portion creates a cavity between the first and second metal portions. The cavity may be one continuous cavity or alternatively, a plurality of cavities, depending on the locations of the fixed portion(s). The cavity may be formed in any shape or size.

For example and with reference to FIGS. 1-2, air (or other gas) is injected within the non-fixed region 56 of the damping panel 20 to create the cavity 28 in the non-fixed region 56. The cavity 28 is one continuous cavity such that the non-fixed region 56 has the first portion 62 joined with the plurality of second portions 64. The first portion 62 of the cavity 28 is formed in a substantially rectangular shape and each of the second portions 64 is formed in a substantially linear shape.

Returning to FIG. 14, the method 1000 at 1500 may optionally include injecting damping material between the first and second metals. The damping material may be injected within the cavity. More specifically, the damping material may be injected within all of the cavity or less than all of the cavity. For example and with reference to FIG. 3, the damping material 122 is injected within all of the cavity 128. In another example and with reference to FIG. 4, the damping material 122 is injected within less than all of the cavity 128. More specifically, the damping material 122 may be injected within all or less than all of the first portion 162 and all or less than all of the plurality of second portions 164. In various implementations, the damping material 122 may be injected concurrently with the injection of air (or other gas) to create the cavity.

Figure 15:
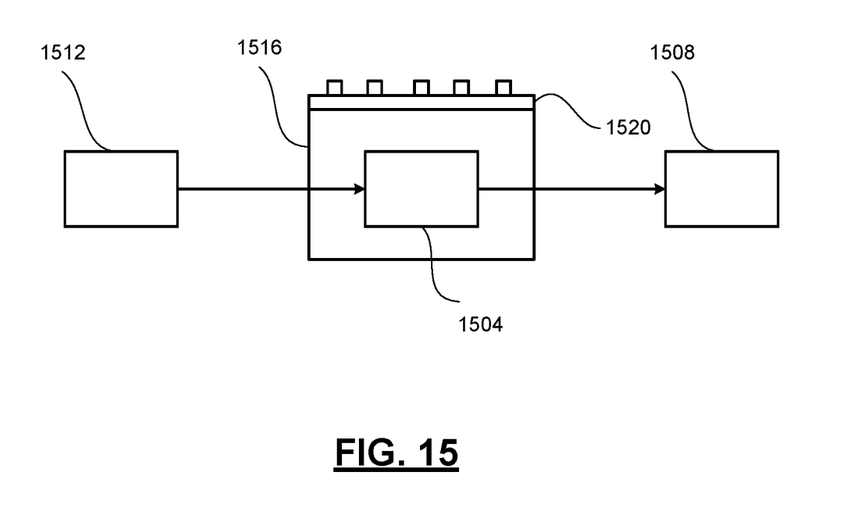
FIG. 15 is a functional block diagram and side view of an example damping system.

FIG. 15 is a functional block diagram and side view of an example damping system. An inverter (or inverter module) 1504 includes switches that connect and disconnect an electric motor 1508 to and from a power source 1512, such as a direct current (DC) bus or another suitable power source. The inverter 1504 is disposed within a housing 1516. A damping panel (e.g., as in FIGS. 3-10) 1520 is disposed on the housing 1516, such as an exterior surface of the housing 1516. The damping panel 1520 damps noise and vibration generated by the inverter 1504, such as switching of the switches.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A damping panel comprising:
   a first metal portion having a first surface and a second surface opposite the first surface;
   a second metal portion having a third surface and a fourth surface opposite the third surface;
   a fixed region where the second surface of the first metal portion is fixed to the third surface of the second metal portion;
   a non-fixed region where the second surface of the first metal portion is not fixed to the third surface of the second metal portion;
   a cavity disposed at the non-fixed region and between the second surface of the first metal portion and the third surface of the second metal portion; and
   a damping material disposed at least one of:
      at least a portion of and less than all of the cavity on the second surface of the first metal portion; and
      at least a portion of and less than all of the cavity on the third surface of the second metal portion,
      wherein the fixed region includes a plurality of equally spaced fixed regions that are linear and parallel to each other,
      wherein the cavity includes a plurality of portions disposed between the equally spaced fixed regions,
      wherein the damping material is disposed in first ones of the portions of the cavity and the damping material is not disposed in second ones of the portions of the cavity, and
      wherein the first ones of the portions of the cavity including the damping material are arranged alternatingly with the second ones of the portions of the cavity not including the damping material.

2. The damping panel of claim 1, further comprising the damping material additionally disposed on less than all of the non-fixed region on the first surface of the first metal portion.

3. The damping panel of claim 1, further comprising the damping material additionally disposed on less than all of the non-fixed region on the fourth surface of the second metal portion.

4. The damping panel of claim 1, wherein the first and second metal portions are made of aluminum.

5. The damping panel of claim 1, wherein the first and second metal portions are made of magnesium.

6. The damping panel of claim 1, wherein the first and second metal portions are welded together at the fixed region.

7. A damping system comprising:
   an inverter housing;
   an inverter disposed within the inverter housing and including switches configured to connect and disconnect an electric motor to and from power; and
   the damping panel of claim 1 disposed on the inverter housing.

8. The damping panel of claim 1 wherein the damping material includes at least one of the damping material includes at least one of an acrylic, propylene oxide, ethylene oxide, polyolefin elastomers, and a silicone.

9. The damping panel of claim 1 wherein the damping material includes at least two of the damping material includes at least one of an acrylic, propylene oxide, ethylene oxide, polyolefin elastomers, and a silicone.

10. A method of manufacturing a damping panel, comprising:
    obtaining a first metal portion having a first surface and a second surface opposite the first surface;
    obtaining a second metal portion having a third surface and a fourth surface opposite the third surface;
    applying the third surface of the second metal portion to the second surface of the first metal portion;
    fixing the first metal portion to the second metal portion to create a fixed region and not fixing the first metal portion to the second metal portion to create a non-fixed region;
    injecting a gas into the non-fixed region thereby creating a cavity between the second surface and the third surface at the non-fixed region; and
    applying a damping material to at least one of:
       at least a portion of and less than all of the second surface within the cavity; and
       at least a portion of and less than all of the third surface within the cavity,
    wherein the fixed region includes a plurality of equally spaced fixed regions that are linear and parallel to each other,
    wherein the cavity includes a plurality of portions disposed between the equally spaced fixed regions,
    wherein the damping material is disposed in first ones of the portions of the cavity and the damping material is not disposed in second ones of the portions of the cavity, and
    wherein the first ones of the portions of the cavity including the damping material are arranged alternatingly with the second ones of the portions of the cavity not including the damping material.

11. The method of claim 10, wherein the fixing includes welding.

12. The method of claim 10, wherein the first and second metal portions are made of aluminum.

13. The method of claim 10, wherein the first and second metal portions are made of magnesium.

14. The method of claim 10, wherein the gas is air.

15. The method of claim 10, wherein the applying the damping material occurs concurrently with the injecting the gas.

16. The method of claim 10, further comprising applying the damping material additionally to less than all of the non-fixed region on the first surface of the first metal portion.

17. The method of claim 10, further comprising applying the damping material additionally to less than all of the non-fixed region on the fourth surface of the second metal portion.

18. The method of claim 10 wherein the damping material includes at least one of the damping material includes at least one of an acrylic, propylene oxide, ethylene oxide, polyolefin elastomers, and a silicone.

19. The method of claim 10 wherein the damping material includes at least two of the damping material includes at least one of an acrylic, propylene oxide, ethylene oxide, polyolefin elastomers, and a silicone.

* * * * *